(12) United States Patent
Tamura et al.

(10) Patent No.: US 7,831,955 B2
(45) Date of Patent: Nov. 9, 2010

(54) DEVELOPMENT AND EXECUTION PLATFORM

(75) Inventors: Tomoyoshi Tamura, Plainsboro, NJ (US); Esther Yu-Fen Yu, Holmdel, NJ (US)

(73) Assignee: Asift Technologies, LLC, Holmdel, NJ (US)

( * ) Notice: Subject to any disclaimer, the term of this patent is extended or adjusted under 35 U.S.C. 154(b) by 1370 days.

(21) Appl. No.: 11/224,665

(22) Filed: Sep. 12, 2005

(65) Prior Publication Data
US 2006/0129985 A1    Jun. 15, 2006

Related U.S. Application Data

(60) Provisional application No. 60/634,824, filed on Dec. 9, 2004.

(51) Int. Cl.
*G06F 9/44* (2006.01)
*G06F 9/46* (2006.01)

(52) U.S. Cl. ............................. 717/100; 719/328
(58) Field of Classification Search .............. 717/100; 719/328

See application file for complete search history.

(56) References Cited

U.S. PATENT DOCUMENTS

| | | | |
|---|---|---|---|
| 4,942,552 A * | 7/1990 | Merrill et al. ............... 710/6 |
| 5,930,512 A | 7/1999 | Boden et al. | |
| 6,006,279 A * | 12/1999 | Hayes ....................... 719/328 |
| 6,247,020 B1 | 6/2001 | Minard | |
| 6,253,255 B1 * | 6/2001 | Hyder et al. ................ 719/321 |
| 6,493,756 B1 * | 12/2002 | O'Brien et al. ............. 709/224 |
| 6,564,201 B1 * | 5/2003 | Hamsa ........................ 707/1 |
| 6,587,849 B1 * | 7/2003 | Mason et al. ................ 707/5 |
| 6,728,948 B1 | 4/2004 | Baxter et al. | |
| 6,820,249 B1 | 11/2004 | Jachmann et al. | |
| 6,836,878 B1 | 12/2004 | Cuomo et al. | |
| 6,889,375 B1 | 5/2005 | Chan et al. | |
| 7,240,327 B2 * | 7/2007 | Singh et al. ................ 717/108 |
| 7,376,586 B1 * | 5/2008 | Partovi et al. .............. 705/26 |
| 7,587,447 B2 * | 9/2009 | Ryman ....................... 709/203 |
| 2003/0101186 A1 * | 5/2003 | Lanzatella et al. ........... 707/10 |
| 2003/0237073 A1 * | 12/2003 | Gardas et al. ............... 717/116 |
| 2005/0033763 A1 * | 2/2005 | Chen et al. .................. 707/102 |
| 2005/0144129 A1 * | 6/2005 | Coolman et al. ............. 705/40 |

OTHER PUBLICATIONS

Karjoth, G. 2003. Access control with IBM Tivoli access manager. ACM Trans. Inf. Syst. Secur. 6, 2 (May 2003), 232-257. DOI= http://doi.acm.org/10.1145/762476.762479.*

* cited by examiner

*Primary Examiner*—James Rutten
(74) *Attorney, Agent, or Firm*—Richard A. Catalina, Jr.

(57) ABSTRACT

An architecture for development and execution of a system for implementing business logic includes an engine providing management of the system and execution of the business logic. A single service-side interface connects the engine to service side plug-in modules, and a single resource side interface connects the engine with resource-side plug-in modules. The server-side and resource-side plug-in modules connect to users and resources, respectively. The single interfaces conform the plug-in module interfaces to one interface to communicate with the engine. The single interfaces employ a single command definition. Development code defining the business logic is written by a user and executed by the engine.

34 Claims, 10 Drawing Sheets

```
module Request {

230 ⌒  struct RequesterInfo {
            string login;
            long companyID;
            string personID;
            string firstName;
            string lastName;
            string phoneNo;
            string phoneExtn;
            string email;
            string fax;
            string countryCode;
            string acct1;
            string acct2;
            string acct3;
            string acct4;
        };
200 ⌒
        interface Sample {
210 ──      RequesterInfo getRequesterInfo(in string user);
        };
                  213              211                   212
};
```

*Fig. 2*
(prior art)

```
300 public RequesterInfo getRequesterInfo(String user) throws Reservation.LoginException {
    Connection con = null;
    Statement st = null;
    RequesterInfo requester = null;
    ResultSet rs = null;
    try {
        con = getConnection();
        st = con.createStatement();
        requester = new RequesterInfo();
        rs = st.executeQuery("SELECT
            FIRST_NAME,LAST_NAME,PHONE_NUMBER,EXTENSION,EMAIL_ADDR,FAX_NUMBER,COUNTRY_CODE,DEFAULT_ACCT_CODE_1,DEFAULT_ACCT_CODE
            _2,DEFAULT_ACCT_CODE_3,DEFAULT_ACCT_CODE_4,COMPANY_ID,PERSON_ID,INET_USER_TYPE FROM PEOPLE WHERE INET_LOGIN
            ='"+user+"'");
            requester.groupMember = "";
        while (rs.next()) {
            if (rs.getString("DEFAULT_ACCT_CODE_1") != null) {
                requester.acct1 = rs.getString("DEFAULT_ACCT_CODE_1");
            }
            else {
                requester.acct1 = "";
            }
            if (rs.getString("DEFAULT_ACCT_CODE_2") != null) {
                requester.acct2 = rs.getString("DEFAULT_ACCT_CODE_2");
            }
            else {
                requester.acct2 = "";
            }

. . .

if (rs.getString("PERSON_ID") != null) {
                requester.personID = rs.getString("PERSON_ID");
            }
            else {
                requester.personID = "";
            } if (rs.getString("INET_USER_TYPE") != null) {
                requester.userType = rs.getString("INET_USER_TYPE");
            }
            else {
                throw new LoginException((short)6,"Invalid user type");
            }
        }
    catch (Exception sql2) {
        sql2.printStackTrace();
        System.out.println ("getRequesterInfo:" + sql2.toString ());
    }
    finally {
    try {
    pool.freeConnection(con);
        if (rs != null) {
            rs.close();
        }
        if ( st != null) {
            st.close();
        }
    }
    catch (SQLException sql3) {
        sql3.printStackTrace();
    }
    }
    return requester;
} private Connection getConnection() throws Exception
{
    Connection con = null;
    try {
        Class.forName(Class.forName("sun.jdbc.odbc.JdbcOdbcDriver");
        con = DriverManager.getConnection(url,
            "myLogin", "myPassword");

}catch (ClassNotFoundException e) {
        throw (new Exception("Cannot find the database driver.(" +
            e.toString() + "]");
    }catch (Exception e){
        throw (e);
    }
    return (con);
}
```

*Fig. 3*
(prior art)

```
public class theServer {
  public static void main(String[] args) {
    try {
      // Initialize the ORB.
      org.omg.CORBA.ORB orb =
        org.omg.CORBA.ORB.init(args,null);

// Initialize the BOA.
      org.omg.CORBA.BOA boa =
        ((com.visigenic.vbroker.orb.ORB)orb)
                                  .BOA_init();

// Create a request object.
      RequestImpl theRequest =
          new RequestImpl();

// Write stringified object
      //reference to a file
      PrintWriter out =
          new PrintWriter(new BufferedWriter(
                  new FileWriter(args[0])));
      out.println(
          orb.object_to_string(theRequest) );
      out.close();

// Tell the BOA that the object
      //is ready to
      // receive requests.
      boa.obj_is_ready(theStock);

// Tell the boa that the
      //server is ready.  This
      // call blocks.
      boa.impl_is_ready();
    } catch (Exception e) {
      System.err.println("Request server error: " + e);
      e.printStackTrace(System.out);
    }
  }
}
```

```
700 ─┐
     ↓
module DOPA { typedef sequence<string>strings;
710 ─┐  typedef sequence<long>longs;
     ╰─ struct rdata {
                long long          id;
                long sql_type;
                long long          status;
715 ─╮          string rdata_name;
                strings  data;
                strings  name;
                longs    type;
        };
                                              720
                                                ╲
        typedef sequence<rdata>rdatas;
        750 ╮                    ╭─ 775
760 ─╮      ↓                   /
     ╰─ interface DopaInterface {
770 ─╮       rdatas DopaCommand (in rdatas parameter);

```
//config file                    900

SERVER: = CORBA, 14015
DATABASE: =
        jdbc:odbc:myDatabase,sun.jdbc.odbc.JdbcOdbcDriver,myL
        ogin,myPassword
```

//source file
1010
    <COMMAND NAME="getRequesterInfo">
            <DATA NAME="PARAM" TYPE="PARAM">
1020            <PARAM>user</PARAM>
            </DATA>

1030    <DATA NAME="getRequesterInfo" TYPE="SELECT">
            <STMT>SELECT
    FIRST_NAME,LAST_NAME,PHONE_NUMBER,EXTENSION,EMAIL_ADD
    R,FAX_NUMBER,COUNTRY_CODE,DEFAULT_ACCT_CODE_1,DEFAULT
    _ACCT_CODE_2,DEFAULT_ACCT_CODE_3,DEFAULT_ACCT_CODE_4,
    COMPANY_ID,PERSON_ID,INET_USER_TYPE FROM PEOPLE WHERE
    INET_LOGIN ='$user'</STMT>
            </DATA>
    </COMMAND>
```

*Fig. 10*

DEVELOPMENT AND EXECUTION PLATFORM

CLAIM OF PRIORITY

This application claims priority to, and incorporates by reference herein in its entirety, pending U.S. Provisional Patent Application Ser. No. 60/634,824, filed Dec. 9, 2004.

FIELD OF THE INVENTION

The present invention relates generally to the field of computer system development and execution. More specifically, the invention relates to a system and method for implementing business logic in a computer system while reducing the burden of writing specialized code.

BACKGROUND OF THE INVENTION

Developing and executing a computer system presently requires a substantial investment of programming time by one or more experienced programmers. While development tools exist for assisting programmers to generate source code for a system, those tools do not eliminate the need for such source code. Some development tools create special languages that reduce the effort, but again, they do not exempt the effort itself.

A typical system development project involves creating code (by either writing the code or by using special code generation tools) for implementing the business logic itself, plus writing or otherwise creating code dealing with non-business-logic tasks such as accessing a database and providing systems service. Code must also be written for communicating with the resources used by the system, such as database servers, mail servers, phone servers and others. Conventional approaches do not separate business logic from non-logic. The developers must therefore struggle not only with the correct implementation of the business logic but also with the correct implementation of those non-logic aspects that usually constitute the majority of any development.

It is nearly always the case that the users (by user we mean a human being or a computer program) and resources that must be communicated with have widely varying interface requirements. For that reason, separate code must be written to communicate with different users and resources, greatly increasing the time and effort that must be spent on system development, not to mention the added complexity and expertise required to accomplish such tasks. Maintaining a system that has been developed in that way is also burdensome. If a user or resource changes, then the coded business logic relating to that part must be changed. Likewise, if the business logic changes, it is frequently the case that portions of the non-logic code must also be changed.

A prior art architecture for developing a system that has a Web-based user interface, a CORBA interface, and access to database and other resources is summarized in FIG. 1. A developer must write source code 110 for each aspect of the system. For example, business logic 120 must be coded according to the CORBA (Common Object Request Broker Architecture) specifications. CORBA is an architecture and specification for creating, distributing, and managing distributed program objects in a network.

The developer must additionally write non-logic code 122 for the system to connect to a CORBA user, and must write non-logic code 124 for the CORBA user. Further, the developer must write non-logic code 126 for the system to connect to a database resource, and must write non-logic code 128 to access the resource according to the database specification.

The system is also to provide a Web-based user interface for end users, and an analogous set of code 130 must be written to allow the system to communicate with the Web. Additional code 140 must also be written for the system to access additional resources, such as email, phone and other servers.

Prior art code for defining interfaces to objects, such as the code 122, 126, must be specially written to handle the potentially large number of commands with various names, taken-in parameter sets, and return data values and the potentially large number of datasets with various data members and data types. An example prior art interface named Sample, shown in FIG. 2, defines a command named getRequesterInfo for retrieving some requested information. The example is written in Interface Definition Language (IDL), an object-oriented interface definition formalism.

The interface definition 200 in the example includes the command definition 210. The command definition has a unique command name 211 and parameter set 212, and return data type 213.

The complex data types typically used in the command definition 210 require specific definitions, such as the data structure RequesterInfo 230. Those definitions must then be adhered to when writing or changing code in the logic 120, and non-logic 122, 124 (FIG. 1). Furthermore, because those definitions are specific to the data requirements with which the business logic is being applied, a separate data type must be defined for each data requirement.

Continuing the example of FIG. 2 in which a system is developed for retrieving some requested information, an extremely simplified Java program 300 for retrieving the requested information from a database is shown in FIG. 3. The developer must take care of the numerous housekeeping matters inherent in any programming language, such as accessing database, handling error capture/exceptions 310, 315 and null data in the database 330, etc.

Additional code must also be written to provide system services. For example, another simplified Java program 400 of FIG. 4, which serves as a CORBA server program, is needed in the user source code.

It can be seen that, while a developer must design code to implement the business logic such as the logic 120, a substantial portion of the developer's work today is dedicated to creating the necessary non-logic code communicating with various parts of the system and coding the business logic in different places to handle different technologies. There is therefore presently a need for a development and execution platform that expedites the building of systems by minimizing programming and debugging time. More particularly, there is a need for a development and execution platform that permits the developer to concentrate on the business logic without the distractions of working with multiple programming languages and technology types. To the inventor's knowledge, no such system is currently available.

SUMMARY OF THE INVENTION

The present invention addresses the needs described above by providing a development and execution platform that reduces a developer's tasks to that of just coding the business logic. Because the platform of the invention takes care of the housekeeping matters, the invention permits developers to write business logic in a much simplified format as compared to, conventional programming languages.

In one embodiment of the invention, a development platform is for building a system providing services for users. The platform includes an engine for providing management of the system and executing business logic, at least one service-side (northbound) plug-in module having a service-side plug-in module interface, and only one service-side interface communicating with the engine and communicating with all the service-side plug-in modules. The service-side interface comprises only one command. The service-side interface supports all service-side plug-in module interfaces (Single Interface Technology), and the one command supports all commands of the service-side plug-in module interfaces (One Command Technology).

The platform may further include at least one resource-side (southbound) plug-in module; and only one resource-side interface communicating with the engine and communicating with all the resource-side plug-in modules. In that case, the resource-side interface comprises only one command. Each of the at least one resource-side plug-in modules may have a resource-side plug-in module interface. In that case, each resource-side plug-in module is for connecting with at least one of the resources, the resource-side interface supports all resource-side plug-in module interfaces (Single Interface Technology), and the one command of the resource-side interface supports all commands of the resource-side plug-in module interfaces (One Command Technology).

The system may be configured through a user-defined configuration file.

One of the service-side plug-in modules may connect to a Web server containing end user interface source code for specifying a Web-based end user interface. The engine in that case allows for loading end user interface source code dynamically, whereby end user interface source code can be reloaded during runtime without restarting the system. The end user interface source code may be defined in an XML file and an HTML file.

The platform may further include an interpreter for interpreting main source code specifying the business logic. In that case, the engine may allow for loading main source code dynamically, whereby main source code can be reloaded during runtime without restarting the system. The main source code may be defined in an XML file.

Each service-side plug-in module is executable.

The engine may allow for loading the resource-side plug-in modules dynamically, whereby a resource-side plug-in module can be reloaded during runtime without restarting the system.

The said service-side interface may be defined in IDL, an interface definition language. Similarly, the resource-side interface may be defined in IDL.

In another embodiment of the invention, a method is provided for implementing a business logic in a platform including an engine, at least one service-side plug-in module, and only one service-side interface communicating with the engine and communicating with all the service-side plug-in modules. The service-side interface comprises only one command. The method includes the step of executing the only one command to support all commands of the service-side plug-in module interfaces.

The platform in which the method is executed may further include at least one resource-side plug-in module and only one resource-side interface communicating with the engine and communicating with all the resource-side plug-in modules. The resource-side interface comprises only one command. Further, each of the resource-side plug-in modules may include a resource-side plug-in module interface, each resource-side plug-in module being for connecting with at least one resource. In that case, the resource-side interface supports all resource-side plug-in module interfaces, and the method further includes the step of executing the only one command to support all commands of the resource-side plug-in module interfaces.

The method may further comprise the step of configuring the system for management through a user-defined configuration file.

One of said service-side plug-in modules may connect to a Web server containing end user interface source code for specifying a Web-based end user interface. In that case, the method may further include the step of reloading the end user interface source code during runtime without restarting the system. The end user interface source code may be defined in an XML file and in an HTML file.

The method may further include the step of interpreting main source code to the engine for specifying the business logic. The step of interpreting the main source code may be performed so that the main source code can be reloaded during runtime without restarting the system. The main source code may be defined in an XML file.

The method may further include the step of loading resource-side plug-in modules dynamically during runtime without restarting the system.

In yet another embodiment of the invention, a development platform is for building a system providing services for users. The platform comprises an engine for providing management of the system and executing business logic, at least one service-side plug-in module, each being executable, and only one service-side interface communicating with the engine and communicating with all the service-side plug-in modules. The service-side interface comprises only one command.

The platform may further provide connections to at least one resource, in which case the platform further comprises at least one resource-side plug-in module, and only one resource-side interface communicating with the engine and communicating with all the resource-side plug-in modules; said resource-side interface comprising only one command.

Each of the at least one resource-side plug-in modules may have a resource-side plug-in module interface, each resource-side plug-in module being for connecting with at least one of the resources. In that case, the resource-side interface supports all resource-side plug-in module interfaces, and the one command of the resource-side interface supports all commands of the resource-side plug-in module interfaces.

Another embodiment of the invention is a computer program product comprising a computer readable recording medium having recorded thereon a computer program comprising code means for, when executed on a computer, instructing said computer to control steps in a method as described above.

BRIEF DESCRIPTION OF THE DRAWINGS

FIG. 2 is a schematic code snip showing a prior art interface defined in IDL for retrieving some requested information.

FIG. 3 is a schematic code snip showing a prior art JAVA code that retrieves the requested information using the interface definition in FIG. 2.

FIG. 4 is a schematic code snip showing a prior art additional JAVA code that is needed for the example in FIG. 2.

FIG. 7 is a schematic code snip showing an example of the interface definition in IDL used in the example of FIG. 6 using the Single Interface Technology and One Command Technology.

FIG. 9 is an example of a user defined system configuration file for retrieving the requested information in FIGS. 2, 3 and 4 according to one embodiment of the invention.

FIG. 10 is an example of main user source code in XML format for retrieving the requested information in FIGS. 2, 3 and 4 according to one embodiment of the invention.

DESCRIPTION OF THE INVENTION

Figure 1:
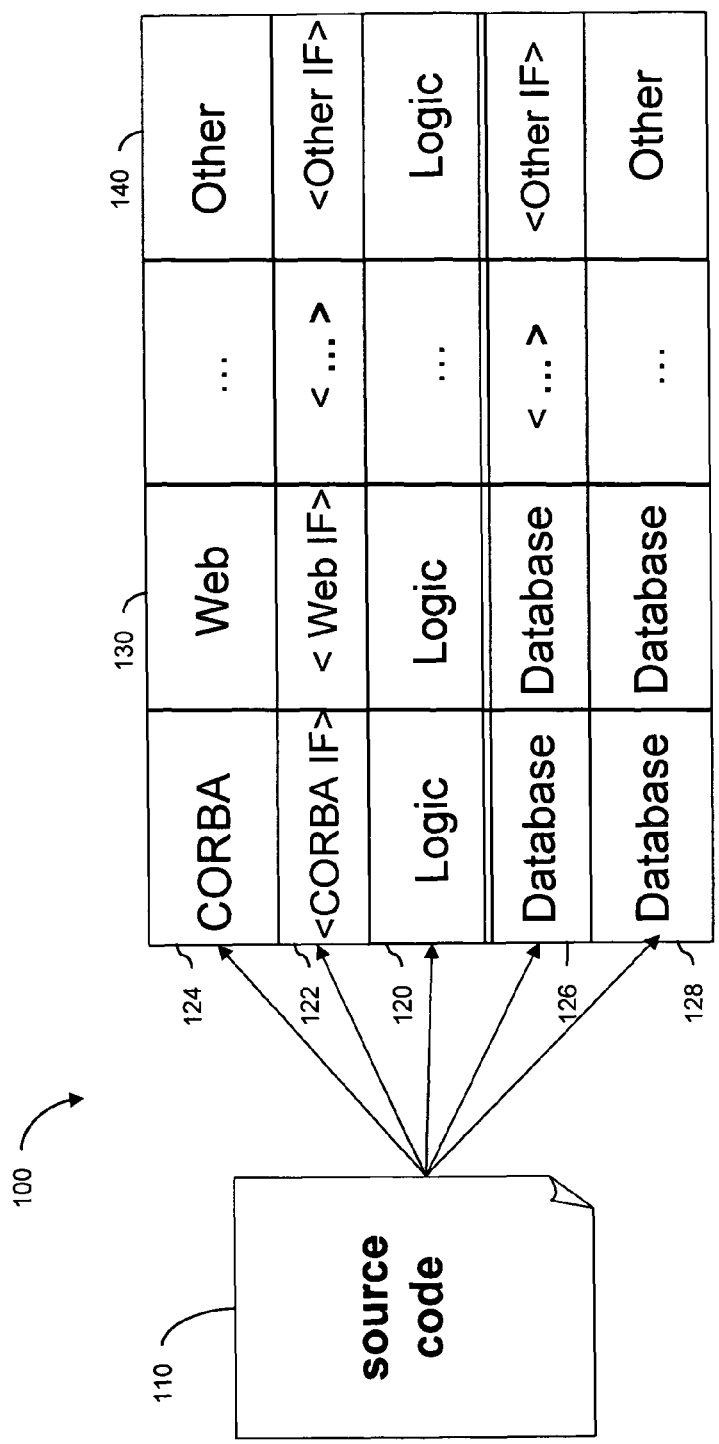
FIG. 1 is a schematic diagram showing a prior art architecture for building a system that has a Web-based user interface, a CORBA interface, and access to a database and other resources.
Figure 5:
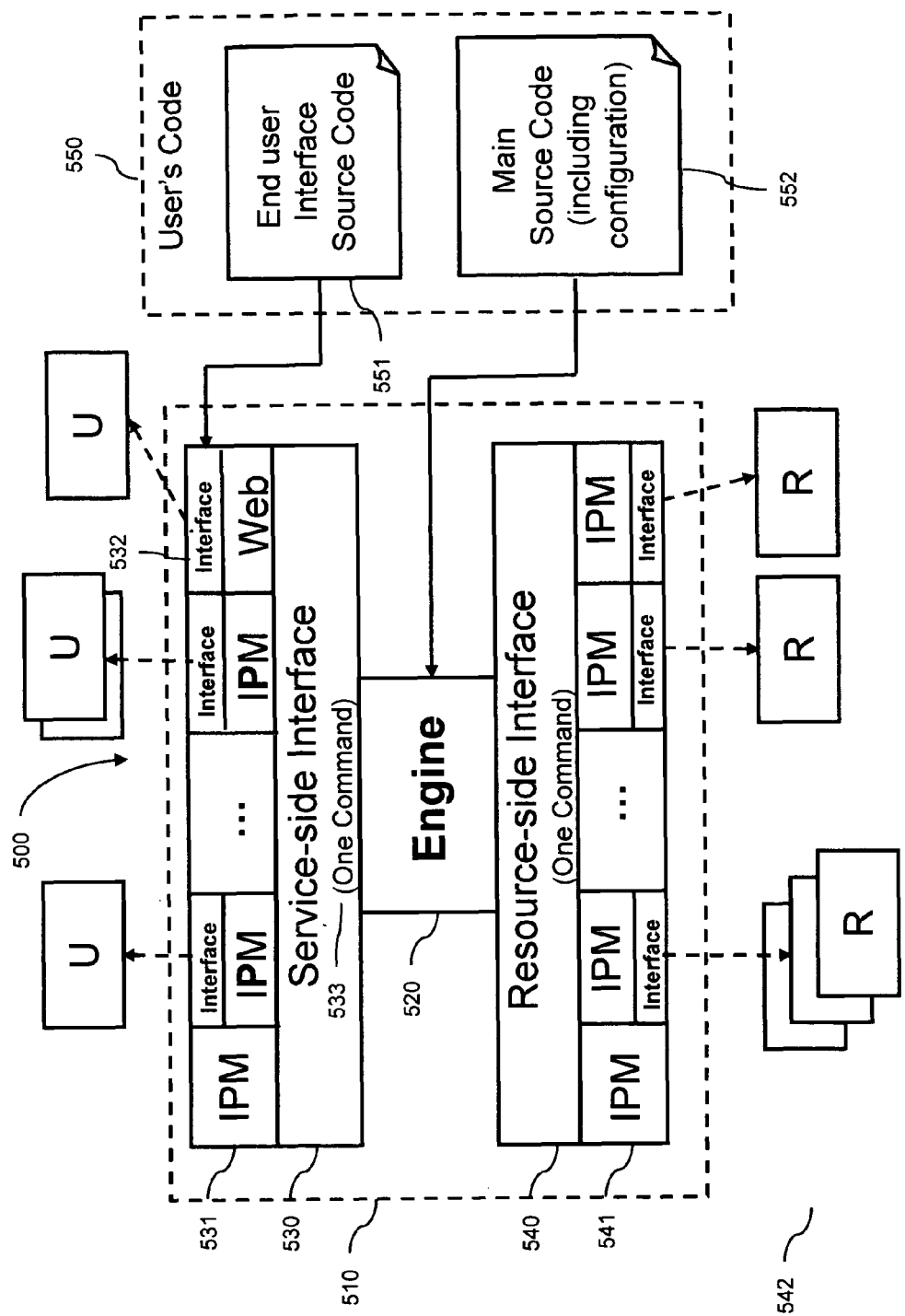
FIG. 5 is an architectural schematic diagram of a development and execution platform according to the invention.

An architecture 500, including the inventive system 510, and associated users' code 550, is shown in the simplified schematic diagram of FIG. 5. The system 510 comprises three principal parts: at the core is the software engine 520, communicating with the engine are interfaces 530, 540 that are separate from the engine, and interface plug-in modules 531, 541. The architecture 500 is sometimes referred to herein as DOPA.

The engine 520, interfaces 530, 540 and interface plug-in modules 531, 541 comprise a pre-built software package that includes all aspects of a target system to be developed except the business logic itself. The engine 520, interfaces 530, 540 and interface plug-in modules 531, 541 are generic in that they are not specialized for any industry such as telecom or banking. The platform includes no business logic pertaining to a particular task.

On the other hand, all other non-logic tasks, such as establishing database connections and providing system service, are performed by the pre-written and pre-tested objects of the present invention. Those objects are independent of each other.

In contrast with automatic code generation techniques, in which generated new code must be later tested in each application, the present invention utilizes pre-built, pre-tested objects for all aspects of the system except for the business logic to be written. Those aspects include objects that are commonly used or that follow standards. A developer therefore is able to concentrate solely on coding and debugging the business logic portion of the system, with all other aspects of the system being pre-built and pre-tested.

The engine 520's main function is to provide control and management of the overall system and to process user logic. The engine 520 may include a collection of functions that is conceptually similar to that contained in many programming languages for the purpose of pre-writing some commonly used code for the convenience of developers.

The main source code 552 and end user interface source code 551 comprise the development code 550 written by the user. The main source code 552 is written in a language that the engine supports, while the end user interface source code 551 are written in languages that the Web interface plug-in module 532 and a Web server support respectively. The main source code 552 defines the business logic to be performed by the system and the end user interface source code 551 defines the Web-based end user interface. That main source code is the only place that must be modified as business logic changes. The term "business logic" as used herein means a task or decision, or a sequence of tasks or decisions, to be performed by the computer system for the particular application being developed. Examples of development code as used in the present invention are explained below with reference to FIG. 10.

The service-side interface 530 and resource-side interface 540, are each interfaces that use the Single Interface Technology (SIFT) of the invention. SIFT allows one interface definition to support different interfaces. SIFT also supports a variety of interface types, such as CORBA, HTTP, SOAP, Telnet, JAVA, etc. and new ones that are yet to come in the future.

The service-side interface 530 and resource-side interface 540, are each middle layers between the engine and all of the plug-in modules, that absorb the differences of various plug-in module interfaces, conform them into one interface, and use the one interface to communicate with the engine. The interfaces employ the One Command Technology of the invention to realize this unique functionality.

One Command Technology 533 is a command definition that supports all sorts of different commands with all sorts of different data types and data structures, and all possible parameter sets and all sorts of return data values.

As will be described in more detail below, the One Command Technology permits the engine to process all commands in a single manner and allows users to write source code 552 in a much simplified format, thus simplifying the processing of writing business logic. That concept dramatically shortens the software development cycle, allowing rapid building of adaptive, large scale, software systems capable of supporting various system features. Debugging and code maintenance become easy and quick.

The engine 520 communicates only with the service-side interface 530 and/or resource-side interface 540. Because the engine 520 communicates with only the interfaces, the engine 520 need not be modified for different interface plug-in modules. In other words, the SIFT allows the persistence of the engine 520.

The service-side interface 530 supports the service-side interface plug-in modules 531 such as the Web-based graphical end user interface module 532. The resource-side interface 540 supports the resource-side interface plug-in modules 541, providing interaction with resources 542 such as databases.

The interface plug-in modules 531, 541 may be pre-built if their interface definitions are known. For example, a CORBA interface module can be pre-built by using its IDL interface definition. That module can be used for all CORBA interfaces, and need not be rewritten for specific applications. Another example, a Web-based end user interface plug-in module 532 can be pre-built on top of the service-side interface for a Web server.

The benefits of separating the interface plug-in modules from the interface itself lies in the following: first, it makes each interface module a "plug-in", instead of hardwired, so that it can switch over to different interface technologies without impacting other parts of a system; second and more importantly, because of its pre-defined, all-purpose and generic Single Interface Technology, it can support new technologies in the future; third, it can support specialized customer interfaces as well.

The engine 520 supports hot swap. It employs the available dynamic object loading technology whereby it is able to hot swap system configuration, user source code and interface plug-in modules during runtime without service interruption.

More than one instance of the system with the same interface plug-in modules or with different plug-in modules can run simultaneously.

Exemplary Embodiment

Figure 6:
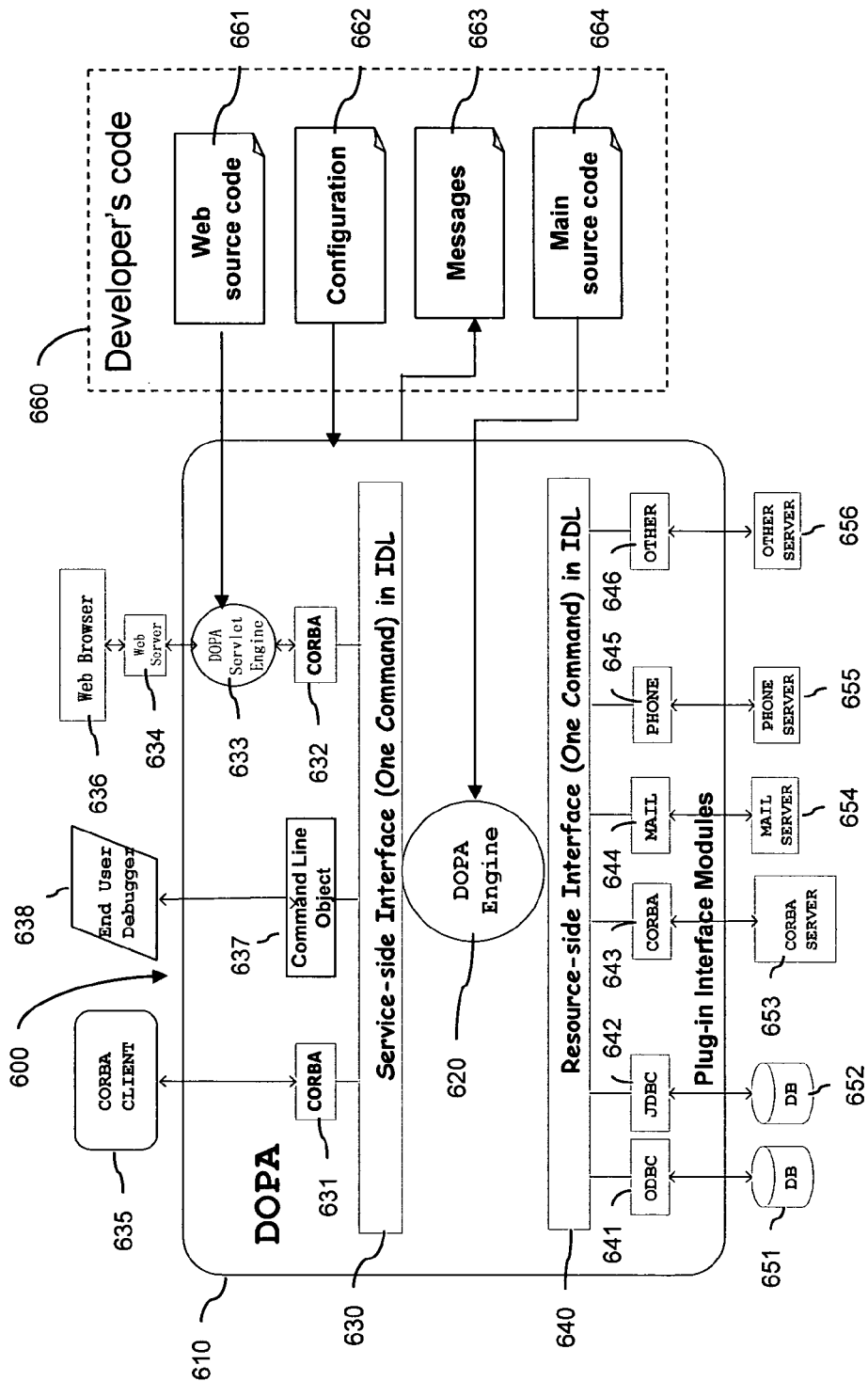
FIG. 6 is an architectural schematic diagram of one example of a development and execution platform according to the invention.

An exemplary embodiment 600 of the system architecture of the invention is shown schematically in FIG. 6. It includes a DOPA system 610 and developer's code 660. The example is included herein as an illustration of one embodiment of the invention, and is in no way intended to limit the scope of the invention. One skilled in the art will recognize that the system and method of the invention may be implemented using other programming languages and technologies.

A DOPA system 610 of the exemplary embodiment includes a DOPA engine 620, a service-side interface 630 in the northbound, two service-side pre-built CORBA plug-in modules 631, 632, a service-side pre-built Command Line Object plug-in module 637 for an End User Debugger, a service-side pre-built DOPA servlet engine 633 connecting to one of the CORBA interface plug-in modules 632, a resource-side interface 640 in the southbound, and a number of resource-side pre-built plug-in modules 641 to 646 connecting to the southbound resources.

Developer's code 660 includes Web source code 661 in HTML/XML for the Web-based display that is read by the DOPA servlet engine 633, configuration code 662 for managing the system dynamically that is to be read by the system 610, messages code in XML 663 that defines system messages, including errors, and DOPA main source code 664 in XML for business logic that is read by the DOPA engine 620.

A pre-built CORBA server interface module 631 provides service to a CORBA client 635. Another instance 632 of the same CORBA plug-in module is used to communicate with the DOPA Servlet engine 633, which connects a Web server 634 for the Web Browser 636. The same CORBA interface module is therefore re-used in two instances. It can be seen that interface modules can be pre-built for clients, relieving the developer of the task of writing code for these interface modules.

A pre-built CORBA client interface module 643 is used in interfacing with a CORBA server 653. The CORBA server can be a CORBA server in a DOPA system. The system 610 in the example contains additional pre-built interface plug-in modules: an ODBC interface plug-in module 641 for a database 651; a JDBC interface plug-in module 642 for another database 652; a mail interface plug-in module 644 for a mail server 654, and phone interface plug-in module 645 for a phone server 655. One skilled in the art will recognize that other interface modules could also be pre-built to be used and re-used in a similar manner.

In implementing the exemplary system of FIG. 6, a developer writes the developer source code 660 as follows: the main source code 664, an XML file for business logic as discussed above, the Web source code 661 in a number of HTML/XML files 661 written for use by a DOPA servlet engine 633 in presenting the Web-based user interface, a configuration file 662 read by the system 610, as discussed below, and a messages file 663 that is defined by the developer to be used in the system.

The developer source code 660 does not require data to be declared in a particular data type or data structure, because the platform has only one command and one data structure, as discussed below, to work with. A var_name=value variable is defined as such without concern for data types. The DOPA engine 620 and DOPA servlet engine 633 convert the variable to appropriate data types when needed, based on context. It also allows users to use as many parameters as needed in a command without the requirement of pre-defining the parameter set in the corresponding command.

A sample interface definition 700 in IDL for both the service-side interface and the resource-side interface using the Single Interface Technology according to the invention is shown in FIG. 7. As can be seen from FIG. 6, the single service-side interface 630 is the only interface defined between the DOPA engine 620 and the interface modules 631, 632, 637 in the northbound. The same is true for the single resource-side interface 640 between the DOPA engine 620 and interface plug-in modules 641 to 646 in the southbound.

Returning to FIG. 7, a single sample interface 750 replaces the multiple, separate interfaces that would otherwise be needed for the multiple interface technologies, databases, etc. of the users and resources that are to be connected. The existence of multiple, separate interfaces has required developers using prior art to alter the core code of a system or to add new code when those connected items change or new ones are added. There is therefore no need to add or alter the existing interface definitions (such as interface definition 700 of FIG. 7), and thus altering the engine 620, when adding support to new interface plug-in modules for different technologies.

The single sample interface 750 is made possible through the use of one and only one command 770 with one command name 775 (DopaCommand in this example). The elements of that single command 770 permit the one command to be sufficient to process all commands that the system may receive and fulfill all requirements. The elements of the single command provide both the data and the operations used by the command.

The sample one command 770 is made possible through the use of the One Data Technology. One Data Technology is a data structure or data type that supports all possible data structures and data types and multiple numbers of data elements.

An example of the One Data Structure using the One Data Technology of the invention is shown in FIG. 7. The one data structure is called rdata 710. The data type used in the one command 770 is called rdatas 720, wherein the rdatas 720 is a sequence of the rdata 710. The elements 715 of the structure 710 provide the generality and flexibility to support all data structures and data types within the one command 770.

A DTD (Document Type Definitions) file 800 (FIG. 8) defines the elements or tag names to be used in the developer's DOPA main source code 664 in XML. The ROOT element is defined to contain zero or more occurrences of COMMAND element, whereas a COMMAND resembles a "method" in conventional programming languages. The COMMAND element following the rules set forth in the DTD 800 includes zero or more DATA elements containing an optional statement (STMT) and zero or more parameters (PARAM) that serve to allow the command to perform business logic all in the same format. Several attribute lists 820 provide additional information associated with the elements COMMAND and DATA. As can be seen in this example, the task of implementing business logic has been reduced to writing an XML file following the simple DTD defined in FIG. 8. In the example DTD of FIG. 8, multiple COMMAND elements can be used to implement business logic. Each COMMAND element may contain multiple DATA elements that include an optional STMT (statement) element and any number of PARAM (parameter) elements.

Returning to FIG. 7 of the exemplary embodiment, the platform of the invention utilizes only one data structure and one data type. It thereby simplifies the developer's code by not requiring a data type at all because all data share the same data type and data structure. The platform has the intelligence to recognize appropriate data types internally, based on context, and to use elements 715 of structure 710 in a sequence 720 to pass in all data values as needed. A developer therefore can use data as needed without the concern of correct data type declaration and matching of pre-defined parameter sets.

FIGS. 9 and 10 illustrate examples of a DOPA configuration file 652 and a DOPA main source code 654 in XML for business logic, respectively, for the purpose of retrieving the requested information as exemplified in FIG. 2. The configuration file 900 of FIG. 9 sets up the configuration of the system, including a CORBA server with a port, and a database with a database name, a database driver and login information.

Figure 8:
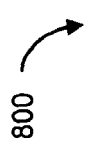
FIG. 8 is an example of the Document Type Definitions (DTD) defined for the main source code in XML used by the engine in the example of FIG. 6.

The XML file 1000 of FIG. 10 describes the business logic to be written by developers using the DTD shown in FIG. 8. In the example, a COMMAND element that is named "getRequesterInfo" is used. It has two DATA element blocks, one contains a PARAM element block 1020 and the other contains a STMT element block 1030.

The PARAM block 1020 declares a parameter called "user" and passes in an identity of the user that logged in. The STMT block 1030 contains business logic for accessing a database table named PEOPLE to extract the requested information for the user. The SQL statement inside the STMT block 1030 is identical to that contained in the prior art user source code illustrated at 320 in FIG. 3. It is notable that the additional coding required in the prior art system shown in FIGS. 2-4 is eliminated, because that additional coding can be known ahead of time and can therefore be pre-written and pre-tested in the DOPA system.

Figure 11:
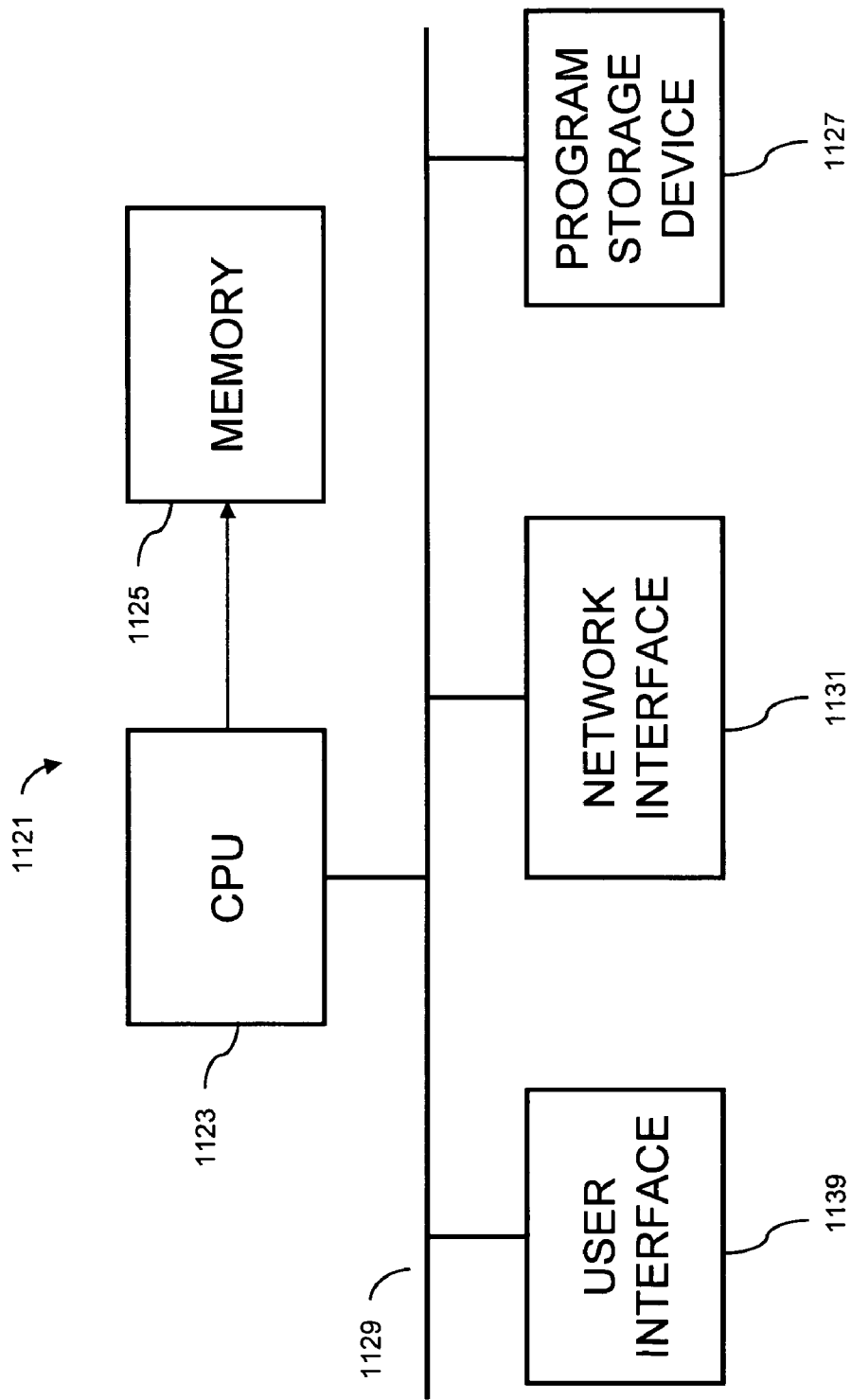
FIG. 11 is a simplified schematic showing one example of a computer on which part or all of the platform of the invention may run.

The above-described invention is a modular framework and is deployed as software as an application program tangibly embodied on a program storage device. The application code for execution can reside on a plurality of different types of computer readable media known to those skilled in the art. A simplified embodiment of a computer 1121 executing the instructions of an embodiment of the invention is shown in FIG. 11. A representative hardware environment is depicted which illustrates a typical hardware configuration of a computer. The computer 1121 includes a CPU 1123, memory 1125, a program storage device 1127, a common communication bus 1129, a network interface 1131 and a user interface 1139. The network interface 1131 allows bi-directional communication between the computer 1121, other computers, and external compatible devices using known communication protocols. The executable instructions are loaded into the memory 1125 from the program storage device 1127. The CPU 1123 executes compatible instructions stored in the memory 1125. Those skilled in the art will appreciate that the invention may be practiced on a variety of other configurations without departing from the scope of the invention.

The foregoing Detailed Description is to be understood as being in every respect illustrative and exemplary, but not restrictive, and the scope of the invention disclosed herein is not to be determined from the Description of the Invention, but rather from the Claims as interpreted according to the full breadth permitted by the patent laws. For example, while the examples deal primarily with CORBA interfaces, systems with other interface technologies may also be developed and executed using the invention, such as HTTP, SOAP, etc. It is to be understood that the embodiments shown and described herein are only illustrative of the principles of the present invention and that various modifications may be implemented by those skilled in the art without departing from the scope and spirit of the invention.

What is claimed is:

1. A computer program product for executing application programs, comprising:
   a computer-readable storage medium; and
   computer program code within the storage medium, said code having instructions for providing:
   (a) a pre-developed engine adapted to (i) execute main source code of the application programs coded using same or different programming languages and (ii) manage pluralities of pre-developed executable resource-side and service-side plug-in modules using pre-defined one-command interfaces, said plug-in modules supporting interfaces between the engine and resources and end users of the application programs,
   wherein the engine is invariant to modifications to the main source code and a number or type of the plug-in modules, the plug-in modules are invariant to modifications to the main source code, and each of the one-command interfaces comprises a pre-developed single command comprising instructions and data, which are determined by the engine and facilitate connectivity between the application programs, their resources and end users;
   (b) at least one pre-developed executable resource-side plug-in module adapted to support (i) an interface to a resource defined in at least one of the application programs and (ii) a first pre-defined one-command interface with the engine, said resource-side plug-in module configurable per an end-user interface code of the application programs; and
   (c) at least one pre-developed executable service-side plug-in module adapted to support (i) an end-user terminal or an end-user interface source code defined in at least one of the application programs and (ii) a second pre-defined one-command interface with the engine.

2. The computer program product of claim 1, wherein the engine uses dynamic object loading technology and is adapted to execute the main source code and manage the plug-in modules dynamically.

3. The computer program product of claim 1, wherein the engine is adapted to execute the application programs coded using the XML (Extensible Markup Language) and DTD (Document Type Definitions) structures thereof.

4. The computer program product of claim 1, wherein the resource-side or service-side plug-in modules are selectively pre-developed based on interface definitions thereof and using Interface Definition Languages (IDLs).

5. The computer program product of claim 1, wherein the resource-side or service-side plug-in modules are compliant with requirements of the XML (Extensible Markup Language) and HTML (Hyper Text Markup Language).

6. The computer program product of claim 1, wherein the resource-side or service-side plug-in modules are selectively adapted to support standardized or custom resource and end-user interfaces.

7. The computer program product of claim 1, wherein the resource-side plug-in modules are selectively adapted to support COBRA (Common Object Request Broker Architecture), HTTP (Hypertext Transfer Protocol) and Command Line Object interfaces.

8. The computer program product of claim 1, wherein the service-side plug-in modules are selectively adapted to support COBRA (Common Object Request Broker Architecture), ODBC (Open Database Connectivity), JDBC (Java Database Connectivity), HTTP (Hypertext Transfer Protocol), SOAP (Simple Object Access Protocol), Telnet (Teletype Network), and Java interfaces.

9. The computer program product of claim 1, wherein the at least one service-side plug-in module adapted to support the end-user interface with a Web browser comprises a servlet engine.

10. The computer program product of claim 1, wherein a single command of the first or second one-command interface comprises both instructions and data and supports data structures, data elements and commands of the respective resource-side or service-side plug-in modules.

11. The computer program product of claim 1, wherein:
the engine interprets the main source code; and
at least a portion of the resource-side or service-side plug-in modules interprets and executes the end-user interface code.

12. The computer program product of claim 1, wherein the resource-side plug-in modules selectively provide connectivity to databases, network or Web servers, COBRA (Common Object Request Broker Architecture), email or phone servers, among other servers or client devices thereof.

13. The computer program product of claim 1, wherein the service-side plug-in modules selectively provide connectivity to network, Web, SOAP (Simple Object Access Protocol) servers, COBRA (Common Object Request Broker Architecture) or SOAP (Simple Object Access Protocol) clients, end-user terminals, or software debugging tools.

14. The computer program product of claim 1, wherein the main source code to the engine and the end-user interface source code to the service-side plug-in modules are provided from remote or resident depositories or a combination thereof.

15. The computer program product of claim 1, wherein the storage medium comprises at least one the storage medium device or portions thereof and is accessible, locally or remotely, using a computer, a plurality of computers, a server, a plurality of servers, or a combination thereof.

16. A method for executing application programs, comprising:
(a) providing a computing apparatus having a processor and a storage medium, said apparatus adapted for accessing the application programs;
(b) storing in the storage medium program code having instructions for providing:
a pre-developed engine adapted to (i) execute main source code of the application programs coded using same or different programming languages and (ii) manage pluralities of pre-developed executable resource-side and service-side plug-in modules using pre-defined one-command interfaces, said plug-in modules supporting interfaces between the engine and resources and end users of the application programs,
wherein the engine is invariant to modifications to the main source code and a number or type of the plug-in modules, the plug-in modules are invariant to modifications to the main source code, and each of the one-command interfaces comprises a pre-developed single command comprising instructions and data, which are determined by the engine and facilitate connectivity between the application programs, their resources and end users;
at least one pre-developed executable resource-side plug-in module adapted to support (i) an interface to a resource defined in at least one of the application programs and (ii) a first pre-defined one-command interface with the engine, said resource-side plug-in module configurable per an end-user interface code of the application programs; and
at least one pre-developed executable service-side plug-in module adapted to support (i) an end-user terminal or an end-user interface source code defined in at least one of the application programs and (ii) a second pre-defined one-command interface with the engine; and
(c) selectively executing the application programs using the pre-constructed engine; wherein the computing apparatus comprises a computer, a plurality of computers, a server, a plurality servers, or a combination thereof.

17. The method of claim 16, further comprising:
in the engine, dynamically executing the main source code and managing the plug-in modules using dynamic object loading technology.

18. The method of claim 16, further comprising:
adapting the engine to execute the application programs coded using the XML (Extensible Markup Language) and DTD (Document Type Definitions) structures thereof.

19. The method of claim 16, further comprising:
pre-developing the resource-side or service-side plug-in modules based on interface definitions thereof and using Interface Definition Languages (IDLs).

20. The method of claim 16, further comprising:
adapting the resource-side or service-side plug-in modules to requirements of the XML (Extensible Markup Language) and HTML (Hyper Text Markup Language) and/or standardized or custom resource and end-user interfaces.

21. The method of claim 16, further comprising:
selectively adapting the resource-side plug-in modules to support COBRA (Common Object Request Broker Architecture), HTTP (Hypertext Transfer Protocol) and Command Line Object interfaces.

22. The method of claim 16, further comprising:
selectively adapting the resource-side plug-in modules to support COBRA (Common Object Request Broker Architecture), Web Browser, and Command Line Object interfaces.

23. The method of claim 16, further comprising:
generating a single command of the first or second one-command interface, said single command supporting data structures, data elements and commands of the respective resource-side or service-side plug-in modules.

24. The method of claim 16, further comprising:
using the engine to interpreter the main source code of the application programs; and
using at least a portion of the resource-side or service-side plug-in modules to interpret and execute the end-user interface code of the application programs.

25. The method of claim 16, further comprising:
adapting the resource-side plug-in modules for selectively providing connectivity to databases, network or Web servers, SOAP (Simple Object Access Protocol) servers, COBRA (Common Object Request Broker Architecture), email or phone servers, among other servers or client devices thereof.

26. The method of claim 16, further comprising:
adapting the service-side plug-in modules for selectively providing connectivity to Web, COBRA (Common Object Request Broker Architecture) or SOAP (Simple Object Access Protocol) clients, end-user terminals, or software debugging tools.

27. The method of claim 16, further comprising:
providing the main source code to the engine and the end-user interface source code to the service-side plug-in modules from remote or resident depositories or a combination thereof.

28. A system for executing application programs, comprising:
a computing apparatus having a processor and a storage medium, said apparatus adapted for storing or accessing the application programs or portions thereof; and
computer program code within the storage medium, said code having instructions for providing:
(a) a pre-developed engine adapted to (i) execute main source code of the application programs coded using same or different programming languages and (ii) manage pluralities of pre-developed executable resource-side and service-side plug-in modules using pre-defined one-command interfaces, said plug-in modules supporting interfaces between the engine and resources and end users of the application programs,
wherein the engine is invariant to modifications to the main source code and a number or type of the plug-in modules, the plug-in modules are invariant to modifications to the main source code, and each of the one-command interfaces comprises a pre-developed single command comprising instructions and data, which are determined by the engine and facilitate connectivity between the application programs, their resources and end users;
(b) at least one pre-developed executable resource-side plug-in module adapted to support (i) an interface to a resource defined in at least one of the application programs and (ii) a first pre-defined one-command interface with the engine, said resource-side plug-in module configurable per an end-user interface code of the application programs; and
(c) at least one pre-developed executable service-side plug-in module adapted to support (i) an end-user terminal or an end-user interface source code defined in at least one of the application programs and (ii) a second pre-defined one-command interface with the engine,
wherein the computing apparatus is selected from the group consisting of a computer, a plurality of interconnected computers, a network or Web server, a plurality of network or Web servers, and a combination thereof.

29. The system of claim 28, wherein:
the engine is adapted to interpret the main source code;
at least a portion of the resource-side or service-side plug-in modules is adapted to interpret or execute the end-user interface code;
the resource-side or service-side plug-in modules are selectively pre-developed based on interface definitions thereof and using Interface Definition Languages (IDLs) and standardized or custom resource and end-user interfaces;
the resource-side or service-side plug-in modules are compliant with requirements of the XML (Extensible Markup Language) and HTML (Hyper Text Markup Language);
the service-side plug-in modules are selectively adapted to support COBRA (Common Object Request Broker Architecture), HTTP (Hypertext Transfer Protocol), SOAP (Simple Object Access Protocol) or Command Line Object interfaces; and
the resource-side plug-in modules are selectively adapted to support COBRA, ODBC (Open Database Connectivity), JDBC (Java Database Connectivity), HTTP, SOAP, Telnet (Teletype Network), and Java interfaces.

30. The system of claim 28, wherein:
a single command of the first or second one-command interface supports data structures, data elements and commands of the respective resource-side or service-side plug-in modules;
the resource-side plug-in modules selectively provide connectivity to databases, network or Web servers, SOAP (Simple Object Access Protocol) servers, COBRA (Common Object Request Broker Architecture), email or phone servers, among other servers or client devices thereof;
the service-side plug-in modules selectively provide connectivity to network, Web, COBRA or SOAP clients, end-user terminals, or software debugging tools; and
the main source code to the engine and the end-user interface source code to the service-side plug-in modules are provided from remote or resident depositories or a combination thereof.

31. A computer program product for executing application programs, comprising:
at least one computer-readable storage medium accessible, locally or remotely, using a computer, a plurality of computers, a server, a plurality of servers, or a combination thereof; and
computer program code within the least one computer-readable storage medium, said code having instructions for providing:
(a) a pre-developed engine adapted to (i) execute a main source code of the application programs coded using same or different programming languages and (ii) manage pluralities of pre-developed executable resource-side and service-side plug-in modules using pre-defined one-command interfaces, said plug-in modules supporting interfaces between the engine and resources and end users of the application programs,
wherein the engine is invariant to modifications to the main source code and a number or type of the plug-in modules, the plug-in modules are invariant to modifications to the main source code, and each of the one-command interfaces comprises a pre-developed single command comprising instructions and data, which are determined by the engine and facilitate connectivity between the application programs, their resources and end users;
(b) at least one pre-developed executable resource-side plug-in module adapted to support (i) an interface to a resource defined in at least one of the application programs and (ii) a first pre-defined one-command interface with the engine, said resource-side plug-in module configurable per an end-user interface code of the application programs; and
(c) at least one pre-developed executable service-side plug-in module adapted to support (i) an end-user terminal or an end-user interface source code defined in at least one of the application programs and (ii) a second pre-defined one-command interface with the engine;
wherein the engine uses dynamic object loading technology and is adapted to execute the main source code and manage the plug-in modules dynamically and execute the application programs coded using the XML (Extensible Markup Language) and DTD (Document Type Definitions) structures thereof.

32. The computer program product of claim 31, wherein:

the engine is adapted to interpret the main source code;

at least a portion of the resource-side or service-side plug-in modules is adapted to interpret or execute the end-user interface code;

the resource-side or service-side plug-in modules are selectively pre-developed based on interface definitions thereof and using Interface Definition Languages (IDLs) and standardized or custom resource and end-user interfaces;

the resource-side or service-side plug-in modules are compliant with requirements of the XML (Extensible Markup Language) and HTML (Hyper Text Markup Language);

the service-side plug-in modules are selectively adapted to support COBRA (Common Object Request Broker Architecture), SOAP (Simple Object Access Protocol) or Command Line Object interfaces; and the resource-side plug-in modules are selectively adapted to support COBRA, ODBC (Open Database Connectivity), JDBC (Java Database Connectivity), HTTP (Hypertext Transfer Protocol), SOAP, Telnet (Teletype Network), and Java interfaces.

33. The computer program product of claim 31, wherein:

a single command of the first or second one-command interface supports data structures, data elements and commands of the respective resource-side or service-side plug-in modules;

the resource-side plug-in modules selectively provide connectivity to databases, network or Web servers, SOAP (Simple Object Access Protocol) servers, COBRA (Common Object Request Broker Architecture), email or phone servers, among other servers or client devices thereof;

the service-side plug-in modules selectively provide connectivity to network, Web, COBRA or SOAP clients, end-user terminals, or software debugging tools; and the main source code to the engine and the end-user interface source code to the service-side plug-in modules are provided from remote or resident depositories or a combination thereof.

34. A computer program product for executing application programs, the computer program product comprising a computer-readable storage medium and computer program code within the storage medium, said code having instructions for providing a pre-developed engine adapted to execute main source code of the application programs and to control:

(a) resource-side plug-in modules adapted to support (i) interfaces to resources defined in the application programs and (ii) a first pre-defined one-command interface with the engine; and (b) service-side plug-in modules adapted to support (i) end-user terminals or end-user interface source code defined in the application programs and (ii) a second pre-defined one-command interface with the engine;

wherein:

the engine is invariant to modifications to the main source code and a number or type of the resource-side or service-side plug-in modules;

the resource-side or service-side plug-in modules are pre-developed modules invariant to modifications to the main source code;

the resource-side plug-in module configurable per an end-user interface code of the application programs; and each of the one-command interfaces comprises a pre-developed single command having instructions and data, which are determined by the engine and facilitate connectivity between the application programs, their resources and end users.

\* \* \* \* \*